(12) United States Patent  (10) Patent No.: US 9,305,331 B2
Huang  (45) Date of Patent: Apr. 5, 2016

(54) IMAGE PROCESSOR AND IMAGE COMBINATION METHOD THEREOF

(71) Applicant: VIVOTEK INC., New Taipei (TW)

(72) Inventor: Chao Tan Huang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 58 days.

(21) Appl. No.: 14/327,304

(22) Filed: Jul. 9, 2014

(65) Prior Publication Data

US 2015/0016747 A1  Jan. 15, 2015

(30) Foreign Application Priority Data

Jul. 12, 2013 (TW) .............................. 102125096 A (51) Int. Cl.
*G06K 9/36* (2006.01)
*G06T 3/40* (2006.01)
*G06T 11/60* (2006.01)

(52) U.S. Cl.
CPC .............. *G06T 3/4038* (2013.01); *G06T 11/60* (2013.01); *G06T 2210/22* (2013.01)

(58) Field of Classification Search
CPC . H04N 1/3872; H04N 1/3875; H04N 1/3876; H04N 5/23238; G06T 5/001; G06T 11/60; G06T 3/4038; G06K 9/3233; G06K 2009/2045

See application file for complete search history.

(56) References Cited

U.S. PATENT DOCUMENTS

| | | | |
|---|---|---|---|
| 5,963,664 A * | 10/1999 | Kumar | G06K 9/32 382/284 |
| 6,804,413 B1 * | 10/2004 | Horie | G06T 11/60 382/284 |
| 7,130,490 B2 | 10/2006 | Elder et al. | |
| 8,427,538 B2 | 4/2013 | Ahiska | |
| 2009/0185028 A1 | 7/2009 | Ogawa | |
| 2011/0025710 A1 * | 2/2011 | Kennedy | G06T 7/0022 382/284 |

* cited by examiner

*Primary Examiner* — Duy M Dang
(74) *Attorney, Agent, or Firm* — Locke Lord LLP; Tim Tingkang Xia, Esq.

(57) ABSTRACT

An image processor and an image combination method thereof are provided. The image processor includes a processing unit for performing the image combination method, and a storing unit for storing an original image and an output image. The image combination method includes the following steps. First, the original image is received from the storing unit. A first processing procedure scales down the original image to generate a first image. A second processing procedure crops the original image to generate a second image. The first image and the second image are combined to form and then be outputted the output image. Accordingly, the image processor and the image combination method are capable of providing the overview and local detailed content of the original image at the same time.

18 Claims, 12 Drawing Sheets

IMAGE PROCESSOR AND IMAGE COMBINATION METHOD THEREOF

CROSS-REFERENCE TO RELATED APPLICATIONS

This non-provisional application claims priority under 35 U.S.C. §119 (a) on Patent Application No(s). 102125096 filed in Taiwan, R.O.C. on Jul. 12, 2013, the entire contents of which are hereby incorporated by reference.

TECHNICAL FIELD

The disclosure relates to an image processing technology, more particularly to an image processor and an image combination method thereof.

BACKGROUND

With the enhancement of photography and image processing as well as the widespread use of photographic equipment in the consuming market, surveillance cameras are widely installed in companies, factories, stores or houses to monitor a specific space. To monitor an object or the movement of the object in the space can ensure the safety of lives and property of an individual person, family or company, can allow users to determine and have a timely response to any possible event or situation, or can allow users to review or follow up the processing and record of any possible event or situation.

To monitor the entire space, the surveillance camera usually captures images with a wide field of view (FOV) (hereinafter referred to as to wide-FOV images). If intending to observe a specific region of the wide-FOV images, a user needs to manually adjust a region of interest to observe the detailed content in the specific region. Since the user only sees either the entire wide-FOV image or the detailed content in the specific region, it is inconvenient for the user to follow up a specific object. During the observation on the specific region with a narrow field of view, information about other objects may be lost.

Additionally, the surveillance camera generally operates in a high resolution to provide clear images and videos. However, an image or a video with a high resolution has a great deal of data occupying a large storage space and more transmission bandwidth. Hence, the hardware cost is very high.

SUMMARY

According to one or more embodiments, the disclosure provides an image combination method. In one embodiment, the image combination method may be applied in an image processor and may include the following steps. Firstly, receive an original image. Then, perform a first processing procedure to reduce a size of the original image to generate a first image. Also, perform a second processing procedure to crop the original image to generate a second image corresponding to a region of interest (ROI). Finally, combine the first image and the second image to generate an output image and then output the output image.

According to one or more embodiments, the disclosure provides an image processor that may perform the above image combination method.

BRIEF DESCRIPTION OF THE DRAWINGS

The present disclosure will become more fully understood from the detailed description given herein below for illustration only and thus does not limit the present disclosure, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

According to various embodiments, the disclosure provides an image processor and an image combination method thereof in order to output images to be seen easily.

Figure 1:
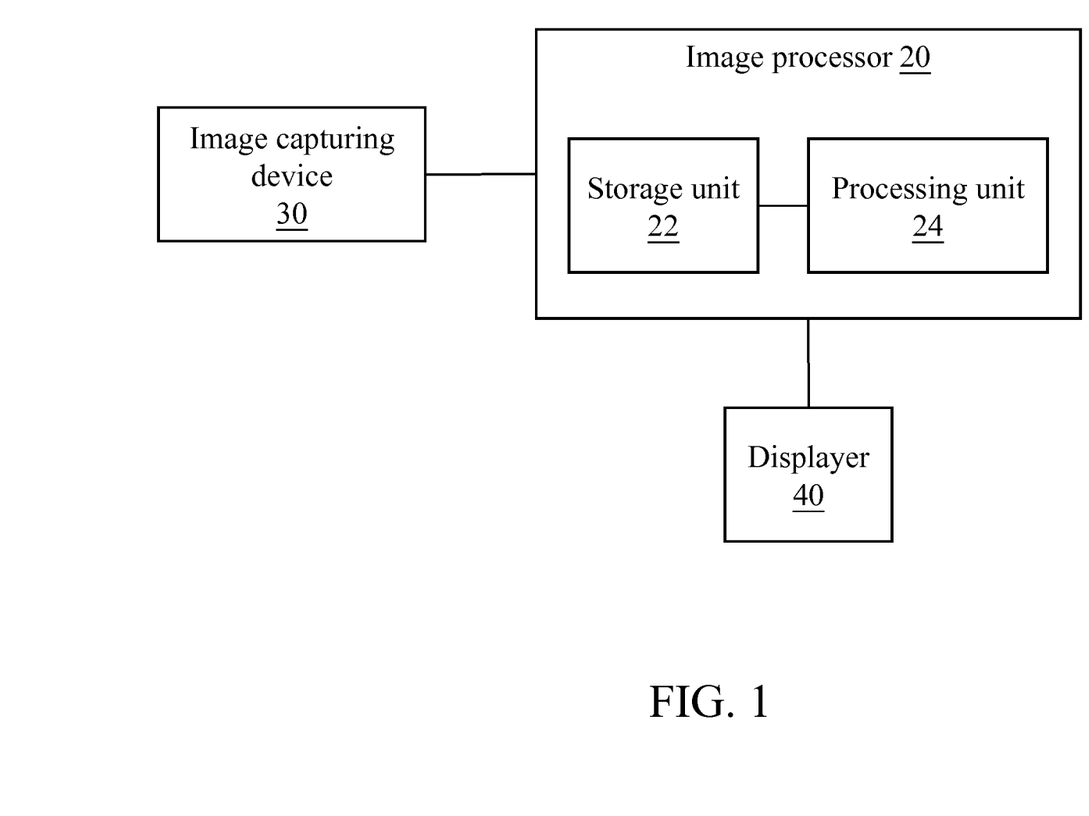
FIG. 1 is a block diagram of an embodiment of an image processor in the disclosure.

Referring to FIG. 1, an embodiment of an image processor 20 is shown. The image processor 20 may include a storage unit 22 and a processing unit 24. The storage unit 22 may store an original image and an output image, and the processing unit 24 may perform the image combination method.

In one or more exemplary embodiments, the storage unit 22 may be a cache memory, a random access memory (RAM), a flash memory, or a hard disk drive. In another embodiment, the image processor 20 may include two or more than two storage units 22. For example, the image processor 20 may include an RAM for provisionally storing original images and a hard disk drive for storing output images for a long time.

The image processor 20 may connect to an image capturing device 30. In one embodiment, the image capturing device 30 may be a lens set with a charge-coupled device (CCD) or a complementary metal-oxide-semiconductor (CMOS). The image capturing device 30 may capture original images and send them to the image processor 20. The image processor 20 and the image capturing device 30 may be disposed in a video camera. The image processor 20 may connect to a displayer 40 such that output images may be displayed by the displayer 40. The image processor 20 may further connect to networks and even connect to a server or a remote displayer through the networks, thereby extending the application of the image processor 20 or a video camera.

Additionally, the image processor 20 may be applied in security surveillance products in the multimedia stream technology, such as a digital video recorder (DVR), a network video recorder (NVR), the video surveillance software of an Internet protocol camera (IP camera), or any possible electric device supporting network access and remote surveillance.

Figure 2:
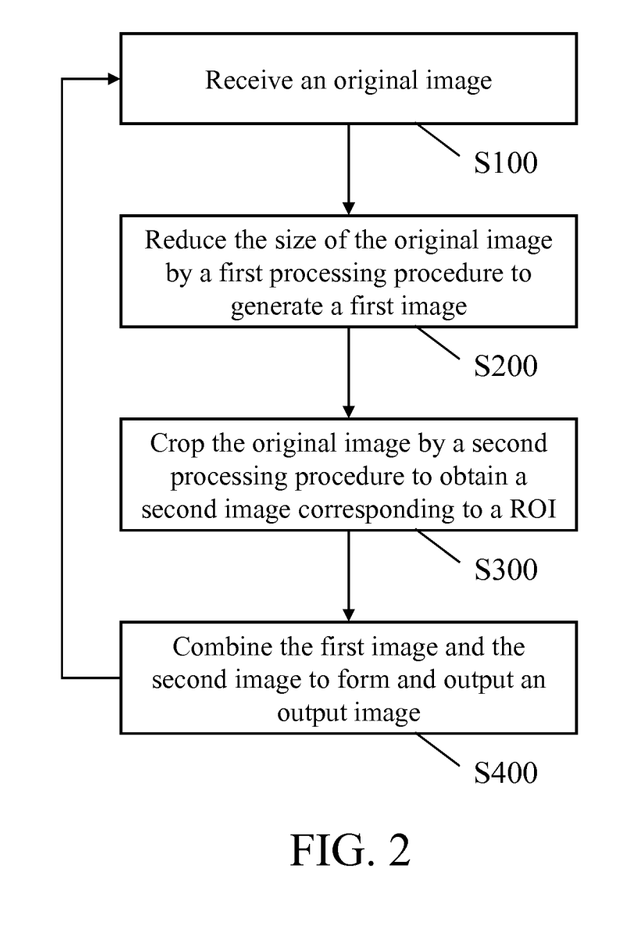
FIG. 2 is a flow chart of an embodiment of an image combination method in the disclosure.

FIG. 2 is a flow chart of an embodiment of an image combination method in the disclosure. Firstly, the processing unit 24 may receive an original image from the storage unit 22 (step S100). Then, the processing unit 24 may reduce (e.g. scale down) the size of the original image by a first processing procedure to generate a first image (step S200), and may crop the original image by a second processing procedure to obtain a second image corresponding to a region of interest (ROI) (step S300). Finally, the processing unit 24 may combine the first image and the second image to form an output image and output the output image to the storage unit 22 or the displayer 40 (step S400).

Figure 3:
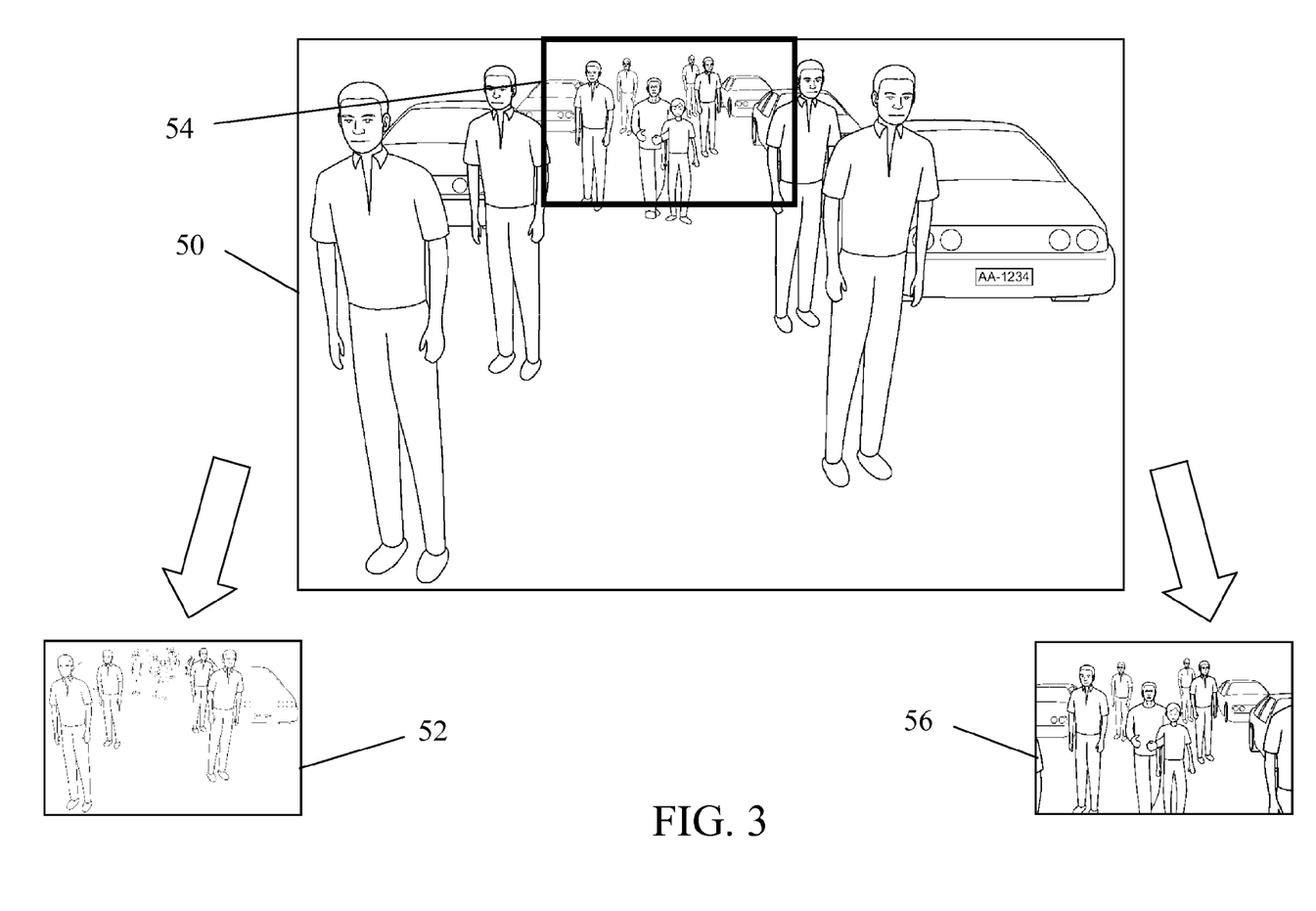
FIG. 3 is a schematic view of an embodiment of the first image and the second image in the disclosure.

FIG. 3 is a schematic view of an embodiment of the first image and the second image in the disclosure. The first image 52 may be a result of reducing the resolution of the entire original image 50. For instance, the original image 50 with a resolution of 1600×1200 pixels may be scaled down to become the first image 52 with a resolution of 576×432 pixels. The second image 56 may be a part of the original image 50 corresponding to the region of interest 54. In the second processing procedure, image within the region of interest 54 may be captured according to the location of the region of interest 54 in the original image 50 and then set as the second image 56.

Figure 4:
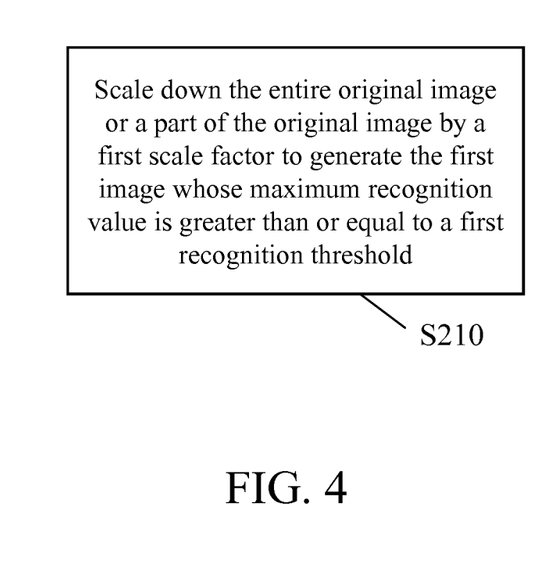
FIG. 4 is a flow chart of an embodiment of a first processing procedure in the disclosure.

FIG. 4 is a flow chart of an embodiment of a first processing procedure in the disclosure. In the first processing procedure, the entire original image 50 or a part of the original image 50 may be scaled down by a first scale factor to generate a first image 52 whose maximum recognition value may be greater than or equal to a first recognition threshold (step S210).

The aforementioned recognition value is also called resolution and indicates how the image quality is and how clear the image is. The unit of the recognition value may be pixel per foot (PPF), dots per inch (DPI), or Line Pairs (LP). The recognition value may be associated with the modulation transfer function (MTF) or the television lines (TVL), and since the modulation transfer function and the television lines are well-known in the art, they will not be repeated hereinafter.

In one embodiment, the processing unit 24 may check whether any human face is presented in the original image 50 or the first image 52. If yes, the processing unit 24 may recognize eyes in the human face and calculate a distance between the eyes. Specifically, the processing unit 24 may link the pupils, inner canthi, or outer canthi of the eyes by a line and then count a number of pixels on the line to obtain the distance between the eyes. The processing unit 24 may divide the distance between the eyes by a reference length and set the result as a recognition value. For example, the reference length may be the average distance between two eyes of people.

In another embodiment, the processing unit 24 may check whether any license plate (or called vehicle registration plate, number plate, or rego plate) is presented in the original image 50 or the first image 52. If yes, the processing unit 24 may calculate the area of the license plate and then divide the area of the license plate by a reference area to obtain the recognition value. The reference area may be equal to the standard size of license plates defined in a country where the image capturing device 30 is used.

Many captured objects may be shown in the same image, and the distances from the image capturing device 30 to the captured objects may be different. The captured object closer to the image capturing device 30 may have a higher recognition value in the image, so the recognition value to the foreground part may be larger than that to the background part in the same image. The processing unit 24 may recognize the foreground part of the original image 50, the first image 52 or the second image 56 to calculate the recognition value of the foreground part as a maximum recognition value. Alternately, the processing unit 24 may select some specific parts of the original image 50, the first image 52 or the second image 56 to calculate recognition values, and then set the maximum one of the recognition values as a maximum recognition value.

In order to ensure that detailed content is enough in the first image 52 and that some of the image information in the original image 50 is remained, the original image 50 may not be scaled down or compressed too much under the first processing mode. Take an example where assume the original image 50 may present many people and cars in a parking lot. The first image 52 generated by scaling down the original image 50 may still show some image information such as the number of people, the colors of people's clothing, the colors of cars, the arrangement of people, and the arrangement of cars. In other words, the number of people, the colors of people's clothes, the colors of cars, the arrangement of people, and the arrangement of cars shown in the first image 52 may still be recognizable to users.

The foreground part of the scaled-down original image 50 may still remain enough detailed content. For example, the facial features and clothing features of the captured people closer to the image capturing device 30 may clearly be recognized in the first image 52.

The processing unit 24 may first set the first scale factor and the first recognition threshold according to the resolution of the original image 50, the resolution of the first image 52, and the scene of captured image. In one embodiment, the scene may be pointed out by a user, or be obtained when the processing unit 24 analyzes the original image 50. The processing unit 24 may set the first scale factor and the first recognition threshold according to different scenes.

Moreover, in the first processing procedure, the original image 50 or a part of the original image 50 may be scaled down to form the first image 52. For instance, when the original image 50 at its edge has a frame having very little image information, the processing unit 24 in the first processing procedure may cut the frame away the original image 50 and then reduce the size of the rest of the original image 50.

Figure 5:
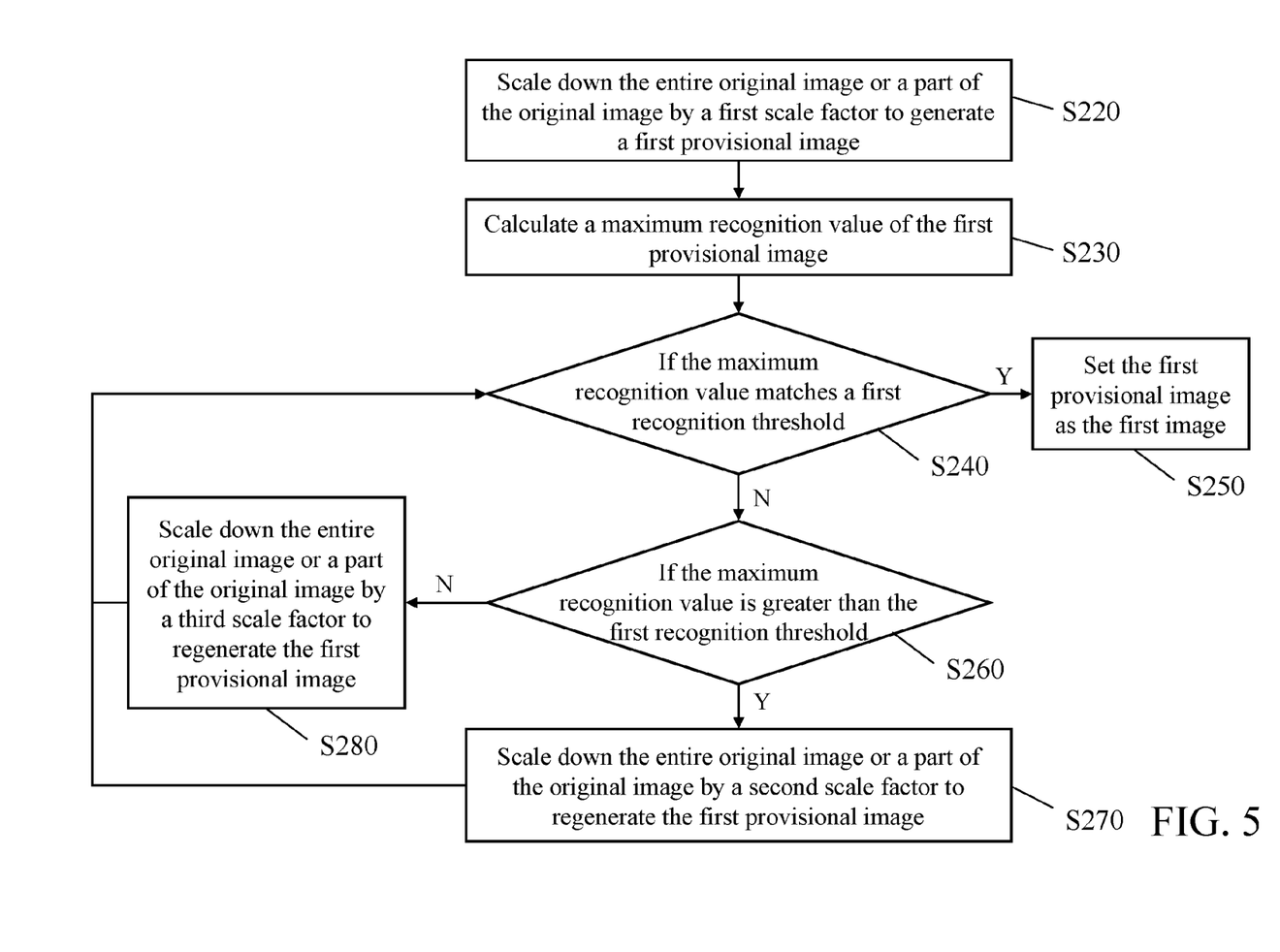
FIG. 5 is a flow chart of an embodiment of a first processing procedure in the disclosure.

FIG. 5 is a flow chart of another embodiment of a first processing procedure in the disclosure. First, the processing unit 24 may scale down the entire original image 50 or a part of the original image 50 by a first scale factor to generate a first provisional image (step S220). Then, the processing unit 24 may calculate a maximum recognition value of the first provisional image (step S230) and determine whether the maximum recognition value of the first provisional image matches a first recognition threshold (step S240). When the maximum recognition value of the first provisional image matches the first recognition threshold, the processing unit 24 may directly set the first provisional image as the first image (step S250).

In one embodiment, while the maximum recognition value is equal to the first recognition threshold, this maximum recognition value may be considered to match the first recognition threshold. In one embodiment, the first recognition threshold may be a range, and if the maximum recognition value is in the range, the maximum recognition value may be considered to match the first recognition threshold.

When the maximum recognition value of the first provisional image does not match the first recognition threshold, the processing unit 24 may further determine whether the maximum recognition value of the first provisional image is greater than the first recognition threshold (step S260). When the maximum recognition value of the first provisional image is greater than the first recognition threshold, the entire original image 50 or a part of the original image 50 may be scaled down by a second scale factor to regenerate the first provisional image (step S270). The second scale factor may be greater than the first scale factor. In contrast, when the maximum recognition value of the first provisional image is smaller than the first recognition threshold, the entire original image 50 or a part of the original image 50 may be scaled down by a third scale factor to regenerate the first provisional image (step S280). The third scale factor is smaller than the first scale factor. The above steps S240, S260, S270 and S280 could be repeated until the maximum recognition value of the first provisional image matches the first recognition threshold. Herein, the first provisional image whose maximum recognition value matches the first recognition threshold may be set as the first image.

In brief, the first processing procedure may reduce the size of the original image 50 to generate the first image 52 which has a smaller resolution but still has enough image information. The first image 52 may not only present the entire captured frame within a wide field of view but also remain the detailed content of the foreground part.

Figure 6:
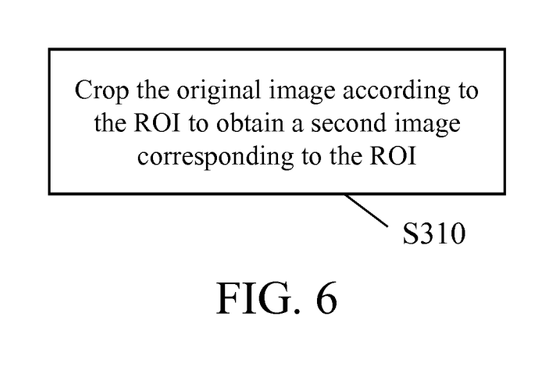
FIG. 6 is a flow chart of an embodiment of a second processing procedure in the disclosure.

FIG. 6 is a flow chart of an embodiment of a second processing procedure in the disclosure. In the second processing procedure, the processing unit 24 may crop the original image 50 according to the region of interest 54 to obtain a second image 56 corresponding to the region of interest 54 (step S310). In other words, a part of the original image 50 may be designated and selected by the region of interest 54, and then the processing unit 24 may set this part as the second image 56. Therefore, the resolution of the second image 56 may remain at that of the original image 50.

Since the resolution of the second image 56 and the resolution of the original image 50 may be the same, the detailed information of a captured object far from the image capturing device 30 may still be remained. For example, assume a license plate of a vehicle presented in the original image 50 is selected via the region of interest 54, and the number of the license plate presented in the original image 50 is recognizable. Then, the number of the license plate shown in the second image 56 may also be recognizable.

In the one or more embodiments, the region of interest 54 may be a preset region set in the image processor 20, may be set by a user, or may be set by the output of an event detection algorithm.

Figure 7:
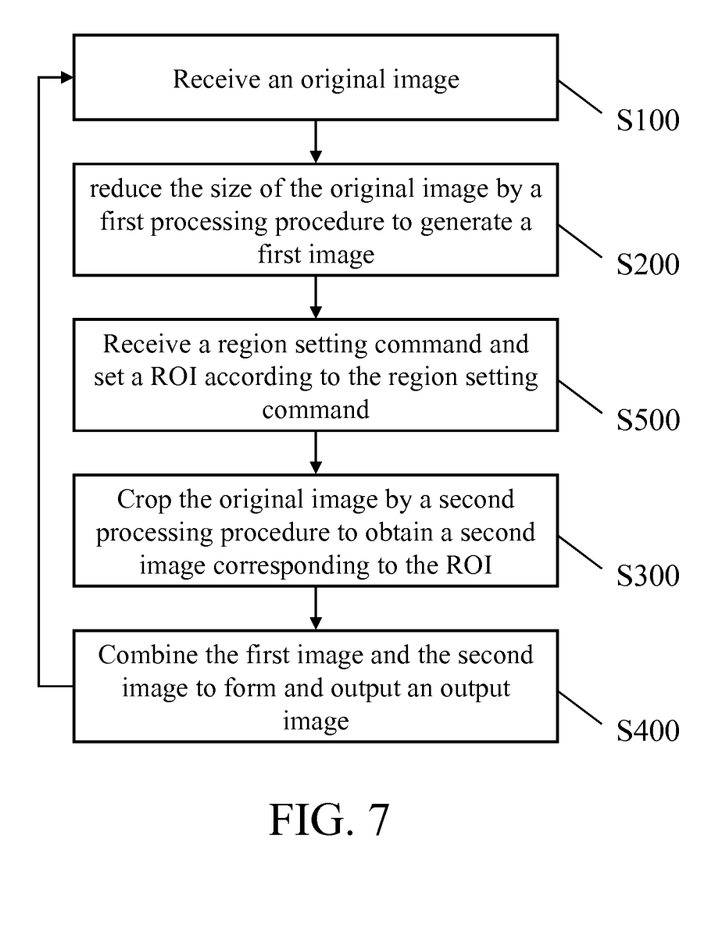
FIG. 7 is a flow chart of an embodiment of an image combination method in the disclosure.

FIG. 7 is a flow chart of an embodiment of an image combination method in the disclosure. Before step S300, the image processor 20 may receive a region setting command and set the region of interest 54 according to the region setting command (step S500). In other words, a user may be allowed to define the location and size of the region of interest 54 in the original image 50 so that the user may be able to see the detailed interesting content in the image. Alternately, the processing unit 24 may set the size and location of the region of interest 54 according to the result of the event detection algorithm such that the user may observe the detailed content presenting an event.

When the second image 56 has a maximum recognition value greater than or equal to the first recognition threshold for the first image and presents enough image information, the second processing procedure may slightly scale down a part of the original image corresponding to the region of interest 54 and then set the scaled-down part as the second image 56, so as to reduce the storage space that the second image 56 occupies.

Figure 8:
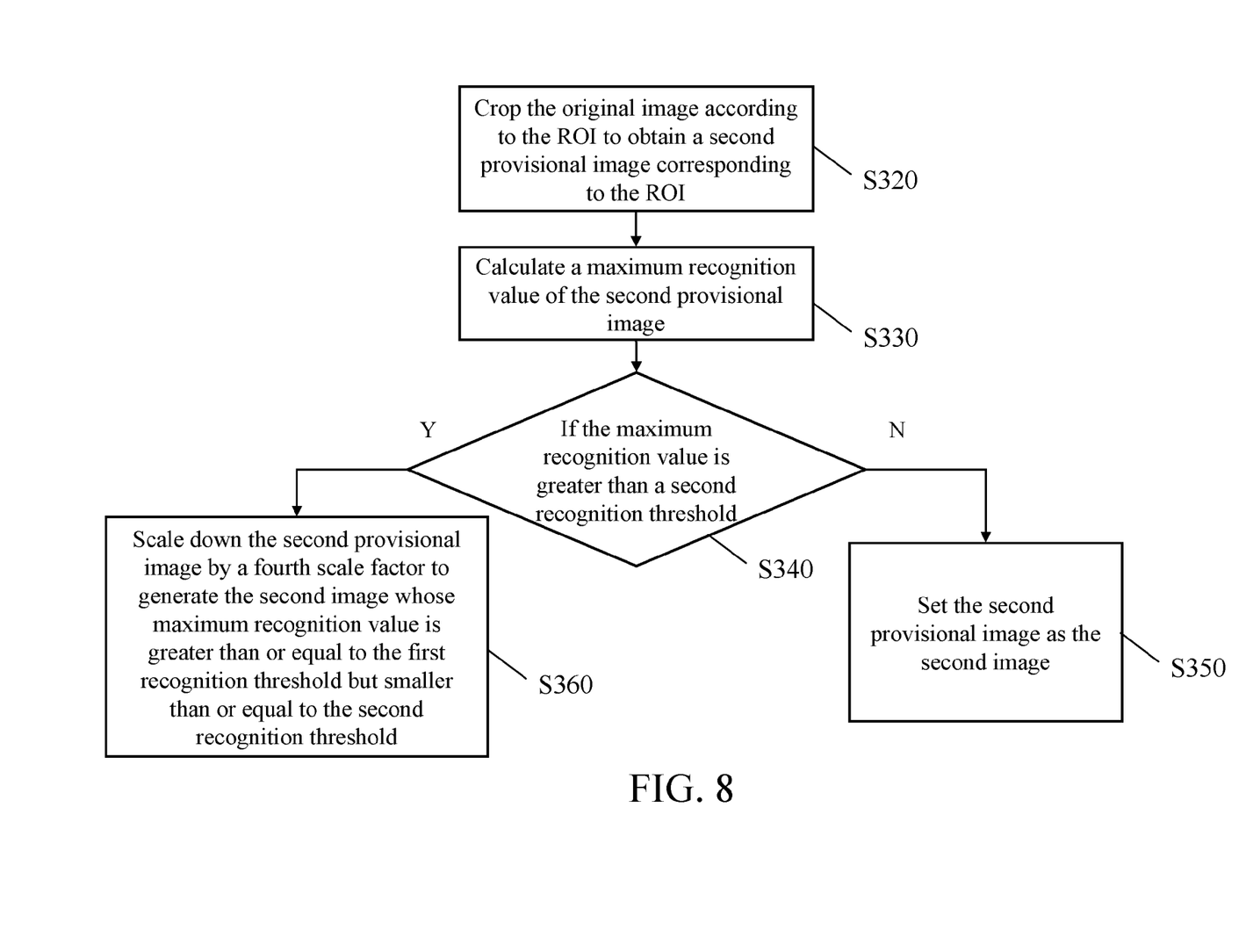
FIG. 8 is a flow chart of an embodiment of a second processing procedure in the disclosure.

FIG. 8 is a flow chart of an embodiment of a second processing procedure in the disclosure. The processing unit 24 may crop the original image 50 according to the region of interest 54 to obtain a second provisional image corresponding to the region of interest 54 (step S320) and may calculate a maximum recognition value of the second provisional image (step S330). Then, the processing unit 24 may determine whether the maximum recognition value of the second provisional image is greater than a second recognition threshold (step S340). The second recognition threshold may be greater than or equal to the first recognition threshold for the first image.

When the maximum recognition value of the second provisional image is greater than or equal to the first recognition threshold but is smaller than or equal to a second recognition threshold, the processing unit 24 may directly set this second provisional image as the second image 56 (step S350). When the maximum recognition value of the second provisional image is larger than the second recognition threshold, this second provisional image may be scaled down by a fourth scale factor to generate the second image 56 such that the maximum recognition value of the scaled-down second provisional image may become greater than or equal to the first recognition threshold but smaller than or equal to the second recognition threshold (step S360). In another embodiment, if the second provisional image obtained by cropping the original image 50 has a recognition value which is not greater than the second recognition threshold, the second provisional image may directly set as the second image 56.

Similar to the setting of the first scale factor and the first recognition threshold, the processing unit 24 may first set the fourth scale factor and the second recognition threshold according to the resolution of the original image 50 and the scene of the captured image. Moreover, the processing unit 24 may set different fourth scale factors and second recognition thresholds to different scenes. For instance, while the subject of a scene is a human face or a license plate, the second recognition threshold may be at 30 PPF.

Figure 9:
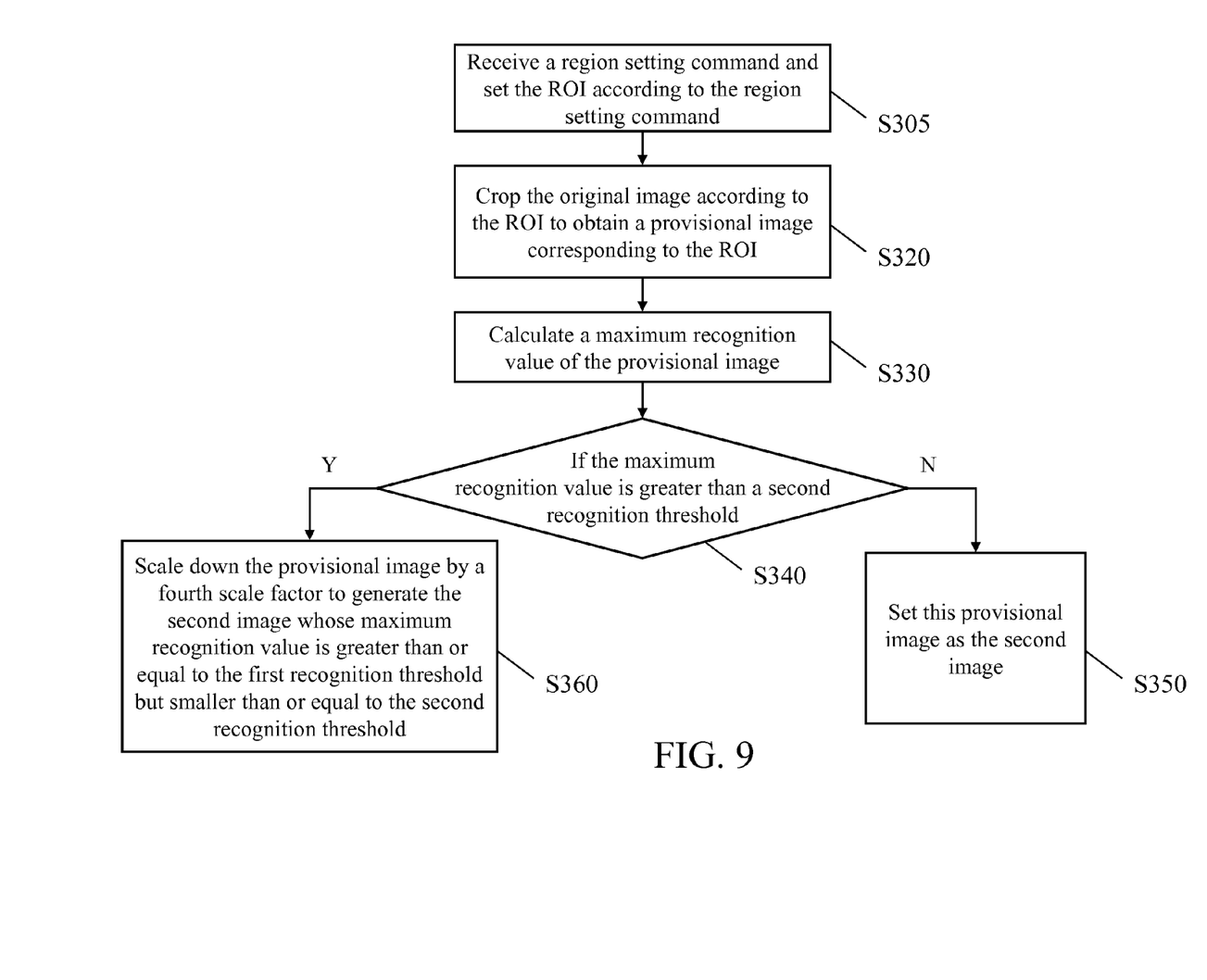
FIG. 9 is a flow chart of an embodiment of a second processing procedure in the disclosure.

In one or more embodiments, the region of interest 54 may be a preset region set in the image processor 20 or be set by a user. As shown in FIG. 9, before step S320, the processing unit 24 may receive a region setting command and set the region of interest 54 according to the region setting command (step S305). Through the region setting command, the user may be able to define the location and size of the region of interest 54.

In brief, the second processing procedure may crop the original image 50 to obtain the second image 56 which is clear and has a smaller field of view. The user may be able to see the detailed information of the captured object, such as the face of a remote person or the number of the license plate of a remote car, in the second image 56. When there is still enough image information in the image, the partial image corresponding to the region of interest 54 may be able to be scaled down and then set as the second image 56. In this way, the required storage space may decrease.

In one embodiment, the order of steps S200 and S300 may be changed. One of the first processing procedure and the second processing procedure may firstly be performed to make a copy of the original image 50 and then scale down or crop the copy. Herein, the original image 50 initially stored in the storage unit 22 may not be edited. Then, the other one of the first processing procedure and the second processing procedure may be performed to scale down or crop the original image 50 which has not been processed yet.

The first image 52 and the second image 56 may respectively present the entire information of the original image 50 and the detailed information of the original image 50, so the image content of the first image 52 is different from that of the second image 56 and the scale-down factor related to the first image 52 is different from the scale-down factor related to the second image 56. For example, the resolution of the first image 52 may be reduced from 1600×1200 pixels to 576×432 pixels. In this case, the scale-down factor is about 2.8 (i.e. 1600÷576≈2.8). For example, if the resolution of the first image 52 is equal to that of the original image 50, the scale-down factor may be 1.

Figure 10:
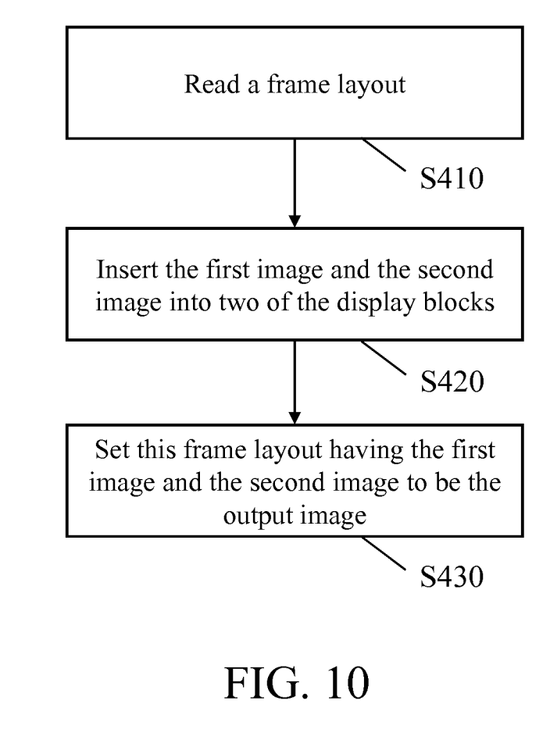
FIG. 10 is a flow chart of an embodiment of step S400 in the disclosure.

FIG. 10 is a flow chart of an embodiment of step S400 in the disclosure. After the first image 52 and the second image 56 are generated, the processing unit 24 may first read out a frame layout which may include multiple display blocks (or called cell) (step S410). Then, the processing unit 24 may insert the first image 52 and the second image 56 into two of the display blocks (step S420) and set this frame layout having the first image 52 and the second image 56 to be the output image (step S430).

Figure 11A:
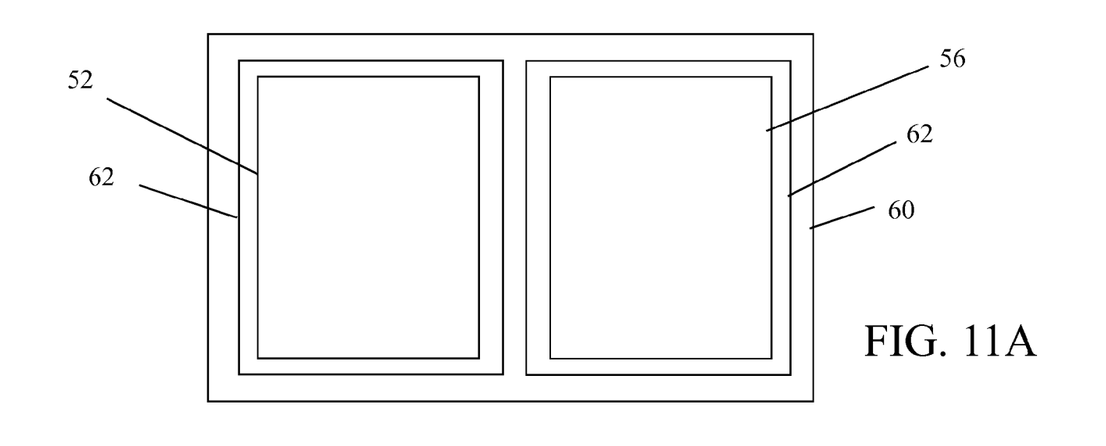
FIG. 11A is a schematic view of an embodiment of a frame layout in the disclosure.
Figure 11B:
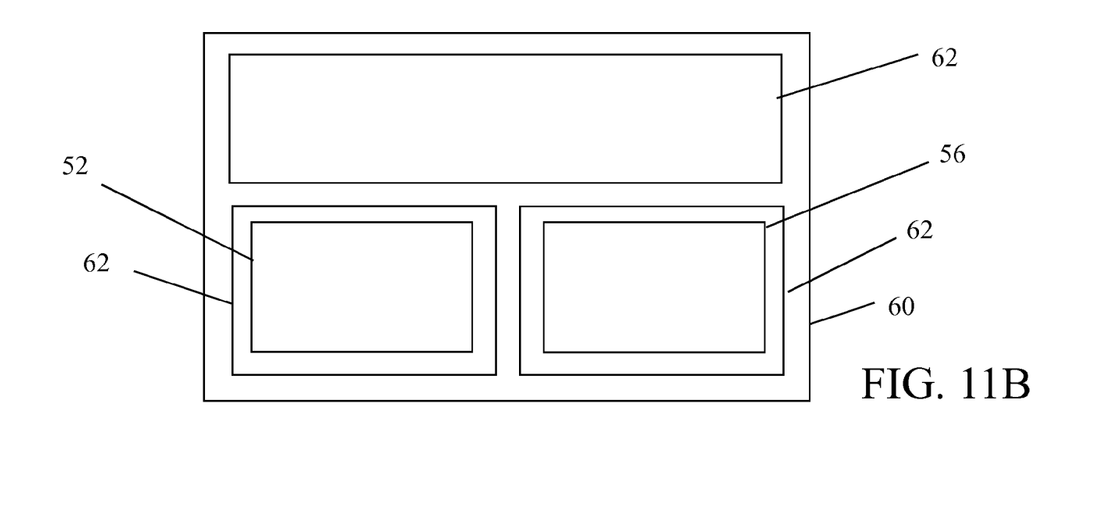
FIG. 11B is a schematic view of an embodiment of a frame layout in the disclosure.

Referring to FIG. 11A and FIG. 11B, various embodiments of a frame layout are shown. The frame layout 60 may include multiple display blocks 62, and each display block 62 may display an image. The display blocks 62 may not overlap each other. The processing unit 24 may select two of the display blocks 62 and then respectively insert the first image 52 and the second image 56 into the two selected display blocks 62. In this case, if there may be three or more than three display blocks 62 in the frame layout 60, the remaining one or more display blocks 62 may be inserted with nothing or images from other sources.

Eventually, the processing unit 24 may compress the entire frame layout 60 to form the output image in a specific image format (step S430). In one embodiment, the image compression standard may be MPEG-4 or H.264. Moreover, the image processor 20 may receive an input video including many successive original images 50 from the image capturing device 30 and then process the successive original images 50 to generate and output successive output images to form an output video.

The output image generated by combining the scaled-down original image 50 and a small image which remains detailed content may need a much smaller storage space than the output image directly formed by the original image 50. In an exemplary embodiment, if the resolution of the original image 50 is 1600×1200 pixels, there is information of 1,920,000 (i.e. 1600×1200=1,920,000) pixels in the original image 50 to be stored. However, if the resolution of the first image 52 and the resolution of the second image 56 are 576×432 pixels, there are only information of 497,664 (i.e. 576×432×2=497,664) pixels in the output image and the output image may present not only the scene with a wide field of view but also the detailed content in the region of interest.

In one embodiment, when the successive original images 50 are being processed, a user may be allowed to dynamically move the region of interest 54 or change the scale-down factor for the second image 56.

Figure 12:
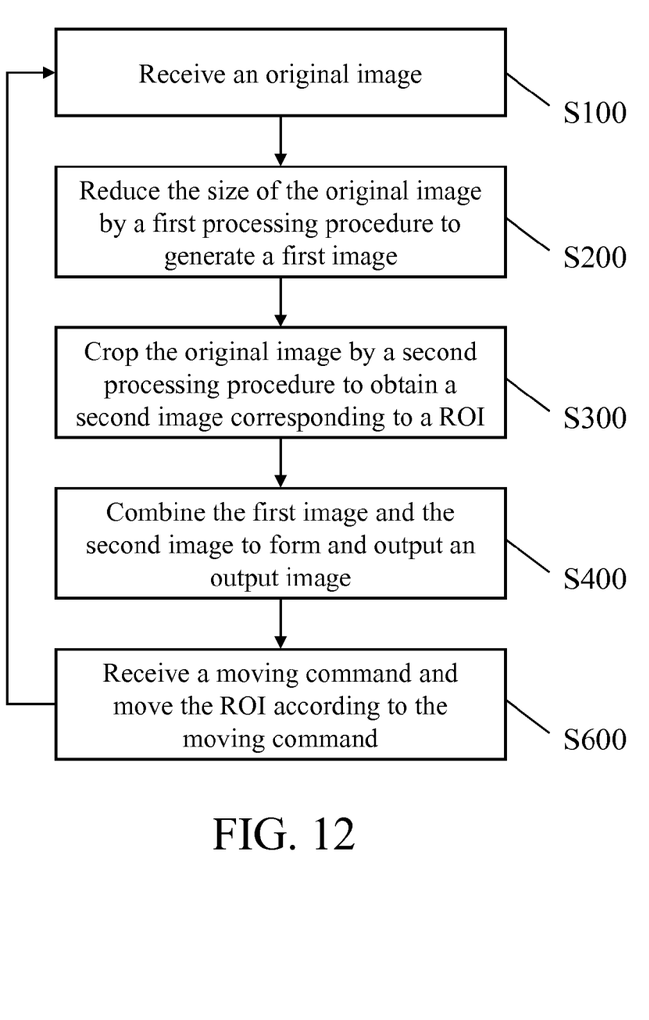
FIG. 12 is a flow chart of an embodiment of an image combination method in the disclosure.
Figure 13:
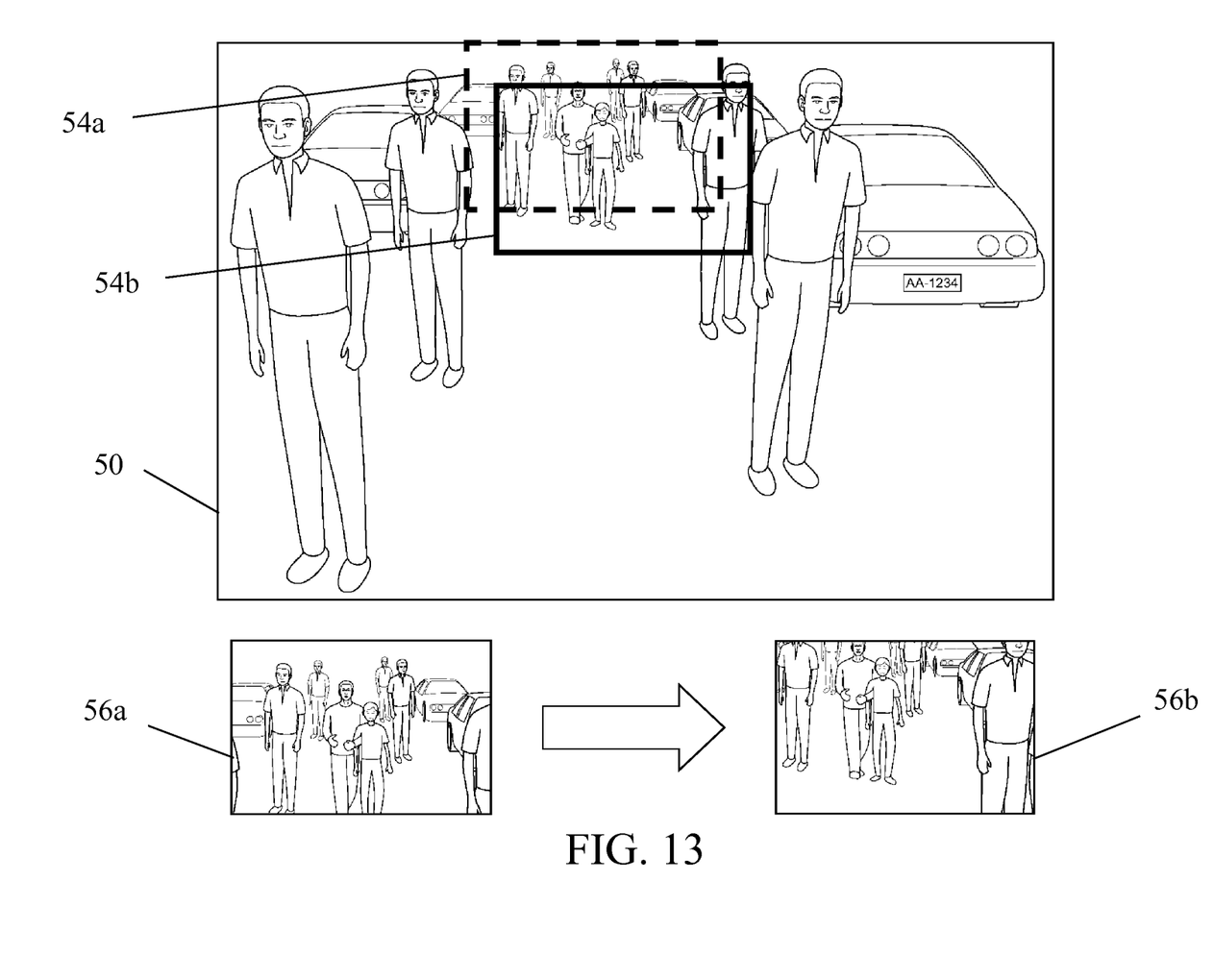
FIG. 13 is a schematic view of an embodiment of a second image in the disclosure.

Referring to FIG. 12 and FIG. 13, an embodiment of an image combination method and an embodiment of a second image are illustrated respectively. After the output image is outputted, the processing unit 24 may receive a moving command and move the region of interest 54 according to the moving command (step S600). For example, when a user intends seeing the face of a person who is captured remotely, the region of interest 54a may be moved from a preset location to the location of the region of interest 54b where the face appears. Instead of the second image 56a corresponding to the region of interest 54a at the preset location, the image capturing device 30 may crop a next original image 50 according to the new region of interest 54b to obtain a new second image 56b, thereby outputting a new output image. The moving command may be used for commanding the region of interest 54 to move up or down or left or right. In some embodiments, the event detection algorithm (e.g. the movement detection algorithm or the object tracking algorithm) may be used for changing the location of the region of interest 54.

Figure 14:
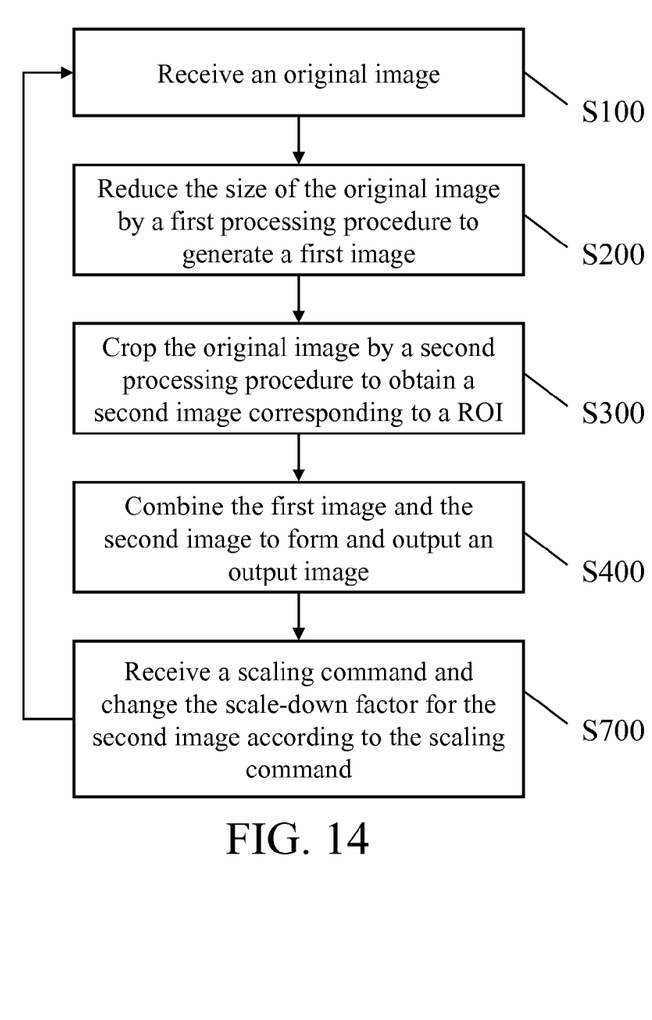
FIG. 14 is a flow chart of an embodiment of an image combination method in the disclosure.
Figure 15:
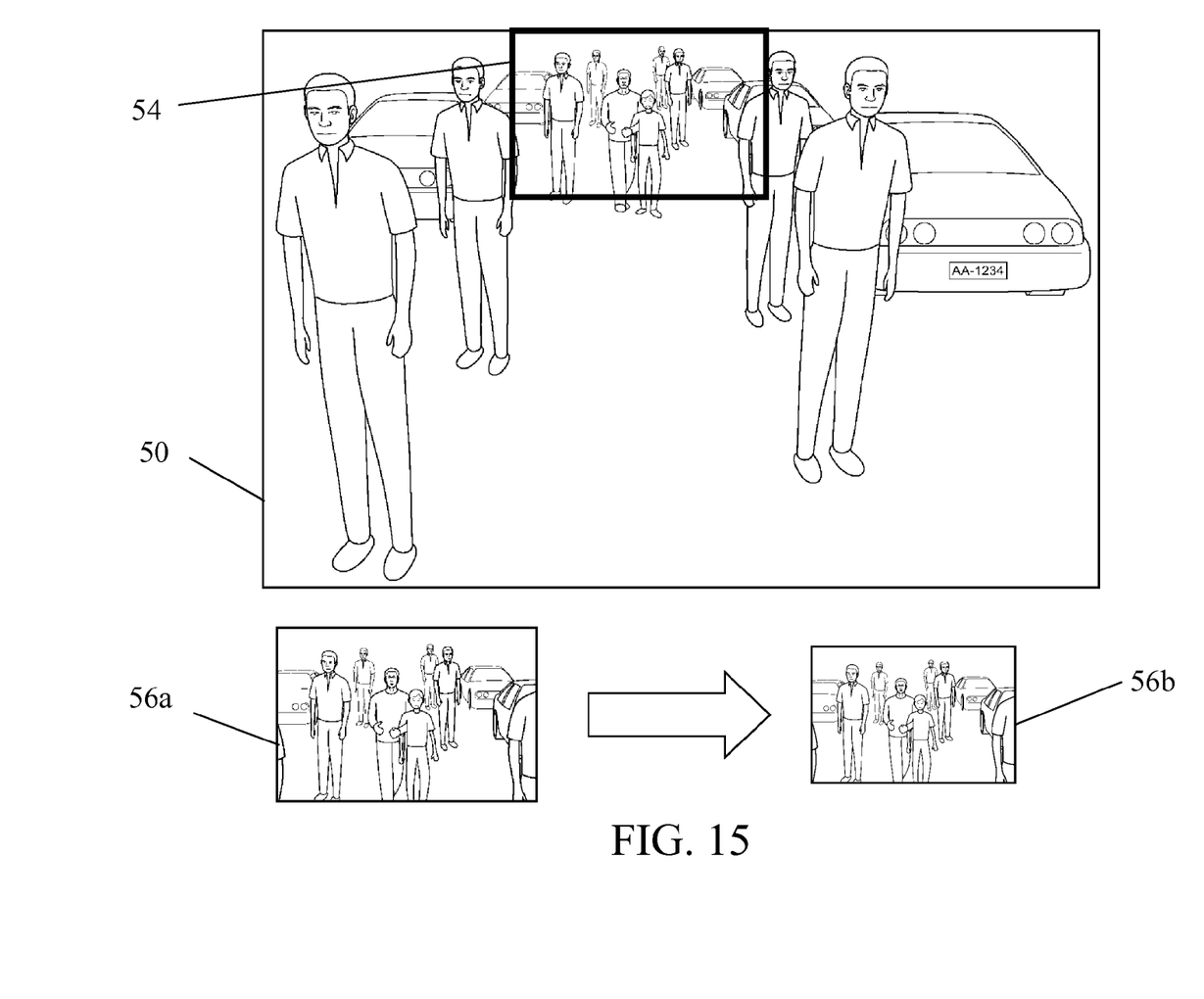
FIG. 15 is a schematic view of an embodiment of a second image in the disclosure.

In one or more embodiments, the size of the region of interest 54 may be changed by similar manners. Referring to FIG. 14 and FIG. 15, an embodiment of an image combination method and an embodiment of a second image are illustrated respectively. After the output image is outputted, the processing unit 24 may receive a scaling command and change the scale-down factor for the second image 56 according to the scaling command (step S700). For instance, when a user determines that image information in the second image 56a is enough, the user may increase the fourth scale factor so that the resolution of the second image 56a may reduce to be equal to or similar to the resolution of the second image 56b. Otherwise, when the user determines that image information in the second image 56a is not enough, the user may decrease the fourth scale factor. In one embodiment, the minimum fourth scale factor may be 1.

In one embodiment, the image processor and the image combination method thereof may cooperate with an auto-detection algorithm, an image identification algorithm, or an auto-authentication algorithm. In one exemplary embodiment, after generating the output image, the processing unit 24 may perform the auto-detection algorithm to automatically detect whether there is any preset specific object (e.g. a car or a man) in the output image. In one exemplary embodiment, after generating the output image, the processing unit 24 may perform the image identification algorithm to automatically identify whether there is any license plate, human face, or moving object in the output image, so as to determine whether any event occurs. In one exemplary embodiment, the processing unit 24 may perform the auto-authentication algorithm to automatically authenticate human faces or license plates to check whether the human faces or license plates are registered.

In order to perform automatic detection, identification or authentication later, the maximum recognition values of the first image 52 and the second image 56 may be increased to ensure the correctness of identification result or authentication result. For example, the second recognition threshold may be set to be 30 PPF in the auto-detection algorithm. For instance, the second recognition threshold may be set to be 40 PPF during the identification or authentication of human faces, or the second recognition threshold may be set to be 60 PPF during the identification or authentication of license plates. The above various settings of the second recognition threshold are examples to clearly describe the disclosure, but the disclosure will not be limited thereto.

In one exemplary embodiment, if the first image 52 or the second image 56 only allows a user to manually determine whether there is any human face, the first recognition threshold or the second recognition threshold may be set to be 2 PPF. In one exemplary embodiment, if the first image 52 or the second image 56 only allows a user to manually identify whether a human face appearing in the first image 52 or the second image 56 indicates a known person, the first recognition threshold or the second recognition threshold may be set to be 30 PPF. In one exemplary embodiment, if the first image 52 or the second image 56 is used for identity authentication, the first recognition threshold or the second recognition threshold may be set to be 80 PPF, thereby ensuring that the image is sufficiently clear.

In one exemplary embodiment, the first recognition threshold or the second recognition threshold may be set to be 1.0±0.25 LP (i.e. about 2±0.5 pixels) for the detection of objects, 1.4±0.35 LP (2.8±0.7 pixels) for the detection of movement of objects, 4±0.8 LP (8±1.6 pixels) for the identification of objects, or 6.4±1.5 LP (12.8±3 pixels) for the authentication of objects.

As set forth above, the first processing procedure may reduce the size of an original image to generate a first image, and the second processing procedure may crop the original image to obtain a second image corresponding to a region of interest. Even if the resolution of the first image is smaller, the first image may be able to present the entire scene with a wide field of view and enough image information. Even if the field of view of the second image is smaller, the second image may still be clear and remain the detailed information of the captured object. By combining the first image with the second image to produce a single output image, the output image may simultaneously present the scene with a wide field of view and the detailed content in the region of interest. In this way, the storage space and transmission bandwidth for the output images may be slashed such that the hardware cost may decrease.

What is claimed is:

1. An image combination method applied in an image processor, comprising:
   receiving an original image;
   performing a first processing procedure to reduce a size of the original image to generate a first image;
   performing a second processing procedure to crop the original image to generate a second image corresponding to a region of interest (ROI); and
   combining the first image and the second image to generate and output an output image,
   wherein the second processing procedure comprises:
      cropping the original image according to the region of interest to obtain a second provisional image corresponding to the region of interest;
      calculating a maximum recognition value of the second provisional image; and
      when the maximum recognition value of the second provisional image is greater than a second recognition threshold, scaling down the second provisional image by a fourth scale factor to generate the second image, wherein the second recognition threshold is greater than or equal to a first recognition threshold for the first image, and the maximum recognition value of the second image is greater than or equal to a first recognition threshold of the first image and smaller than or equal to the second recognition threshold.

2. The image combination method according to claim 1, further comprising:
   receiving a region setting command and setting the region of interest according to the region setting command.

3. The image combination method according to claim 1, wherein the region of interest is a preset region.

4. The image combination method according to claim 1, wherein the first processing procedure comprises:
   scaling down the original image or a part of the original image by a first scale factor to generate the first image whose maximum recognition value is greater than or equal to a first recognition threshold.

5. The image combination method according to claim 1, wherein the second processing procedure comprises:
   cropping the original image according to the region of interest to obtain the second image corresponding to the region of interest.

6. The image combination method according to claim 1, wherein the step of combining the first image and the second image to generate the output image and then output the output image comprises:
   reading a frame layout which comprises a plurality of display blocks;
   inserting the first image and the second image into two of the plurality of display blocks; and
   setting the frame layout where the first image and the second image are inserted, to be the output image.

7. The image combination method according to claim 1, further comprising:
   receiving a moving command and moving the region of interest according to the moving command.

8. The image combination method according to claim 1, further comprising:
   receiving a scaling command and changing a scale factor for scaling down the second image according to the scaling command.

9. An image combination method applied in an image processor, comprising:
   receiving an original image;
   performing a first processing procedure to reduce a size of the original image to generate a first image;
   performing a second processing procedure to crop the original image to generate a second image corresponding to a region of interest (ROI); and
   combining the first image and the second image to generate and output an output image,
   wherein the first processing procedure comprises:
      scaling down the original image or a part of the original image by a first scale factor to generate a first provisional image;
      calculating a maximum recognition value of the first provisional image;
      when the maximum recognition value of the first provisional image is greater than a first recognition threshold, scaling down the original image or the part of the original image by a second scale factor to generate the first provisional image, wherein the second scale factor is greater than the first scale factor;
      when the maximum recognition value of the first provisional image is smaller than the first recognition threshold, scaling down the original image or a part of the original image by a third scale factor to update the first provisional image, wherein the third scale factor is smaller than the first scale factor; and
      repeating the above steps until the maximum recognition value of the first provisional image matches the first recognition threshold, and then setting the first provisional image as the first image.

10. An image processor for performing an image combination method that comprises:
- receiving an original image;
- performing a first processing procedure to reduce a size of the original image to generate a first image;
- performing a second processing procedure to crop the original image to generate a second image corresponding to a region of interest (ROI); and
- combining the first image and the second image to generate and output an output image,
- wherein the second processing procedure comprises:
  - cropping the original image according to the region of interest to obtain a second provisional image corresponding to the region of interest;
  - calculating a maximum recognition value of the second provisional image; and
  - when the maximum recognition value of the second provisional image is greater than a second recognition threshold, scaling down the second provisional image by a fourth scale factor to generate the second image, wherein the second recognition threshold is greater than or equal to a first recognition threshold for the first image, and the maximum recognition value of the second image is greater than or equal to a first recognition threshold of the first image and smaller than or equal to the second recognition threshold.

11. The image processor according to claim 10, wherein the image combination method further comprises:
- receiving a region setting command and setting the region of interest according to the region setting command.

12. The image processor according to claim 10, wherein the region of interest is a preset region.

13. The image processor according to claim 10, wherein the first processing procedure comprises:
- scaling down the original image or a part of the original image by a first scale factor to generate the first image whose maximum recognition value is greater than or equal to a first recognition threshold.

14. The image processor according to claim 10, wherein the first processing procedure comprises:
- scaling down the original image or a part of the original image by a first scale factor to generate a first provisional image;
- calculating a maximum recognition value of the first provisional image;
- when the maximum recognition value of the first provisional image is greater than a first recognition threshold, scaling down the original image or the part of the original image by a second scale factor to generate the first provisional image, wherein the second scale factor is greater than the first scale factor;
- when the maximum recognition value of the first provisional image is smaller than the first recognition threshold, scaling down the original image or a part of the original image by a third scale factor to update the first provisional image, wherein the third scale factor is smaller than the first scale factor; and
- repeating the above steps until the maximum recognition value of the first provisional image matches the first recognition threshold, and then setting the first provisional image as the first image.

15. The image processor according to claim 10, wherein the second processing procedure comprises:
- cropping the original image according to the region of interest to obtain the second image corresponding to the region of interest.

16. The image processor according to claim 10, wherein the step of combining the first image and the second image to generate the output image and then output the output image comprises:
- reading a frame layout which comprises a plurality of display blocks;
- inserting the first image and the second image into two of the plurality of display blocks; and
- setting the frame layout where the first image and the second image are inserted, to be the output image.

17. The image processor according to claim 10, wherein the image combination method further comprises:
- receiving a moving command and moving the region of interest according to the moving command.

18. The image processor according to claim 10, wherein the image combination method further comprises:
- receiving a scaling command and changing a scale factor for scaling down the second image according to the scaling command.

* * * * *